United States Patent
Yamane et al.

(10) Patent No.: US 11,407,467 B2
(45) Date of Patent: Aug. 9, 2022

(54) STABLE BALANCE CONTROLLER

(71) Applicant: Honda Motor Co., Ltd., Tokyo (JP)

(72) Inventors: Katsu Yamane, Mountain View, CA (US); Chihiro Kurosu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 464 days.

(21) Appl. No.: 16/375,111

(22) Filed: Apr. 4, 2019

(65) Prior Publication Data

US 2020/0086941 A1 Mar. 19, 2020

Related U.S. Application Data

(60) Provisional application No. 62/731,290, filed on Sep. 14, 2018.

(51) Int. Cl.
*B25J 19/00* (2006.01)
*B62K 11/00* (2006.01)
*G05B 19/4155* (2006.01)
*G05D 1/08* (2006.01)

(52) U.S. Cl.
CPC ........ *B62K 11/007* (2016.11); *G05B 19/4155* (2013.01); *G05D 1/0891* (2013.01); *B25J 19/0008* (2013.01); *G05B 2219/36249* (2013.01)

(58) Field of Classification Search
CPC .. B62K 11/00; B62K 11/007; G05B 19/4155; G05B 2219/36249; G05D 1/08; G05D 1/0891; B25J 19/00; B25J 19/0008
See application file for complete search history.

(56) References Cited

U.S. PATENT DOCUMENTS

| | | | |
|---|---|---|---|
| 6,302,230 B1 | 10/2001 | Kamen et al. | |
| 7,092,856 B1 * | 8/2006 | Hojo | G05B 13/042 703/2 |
| 2017/0349267 A1 * | 12/2017 | Venkataraman | B64C 13/18 |

OTHER PUBLICATIONS

J. Fong, "Design and build a ballbot", The University of Adelaide, 2009 (Year: 2009).*
P. Fankhauser, Modeling and control of a ballbot, Eidgenssische Technische Hochschule Zirch, 2010 (Year: 2010).*
D. Anderson, "nBot Balancing Robot," http://www.geology.smu.edu/dpa-www/robo/nbot/.

(Continued)

*Primary Examiner* — Khoi H Tran
*Assistant Examiner* — Sarah A Tran
(74) *Attorney, Agent, or Firm* — Rankin, Hill & Clark LLP

(57) ABSTRACT

According to one aspect, a control system for providing stable balance control may include an $H^\infty$ controller, a state-feedback circuit, a first feedback loop, and a second feedback loop. The control system may be implemented in a robot as a controller for the robot. The $H^\infty$ controller may receive an input signal and generate a control effort signal. The state-feedback circuit may receive the control effort signal as an input and generate an output signal. The feedback loop may include the $H^\infty$ controller and the state-feedback circuit and may transfer the output signal of the state-feedback circuit back to the input of the $H^\infty$ controller and input a tracking error input signal to the $H^\infty$ controller. The tracking error input signal may be the difference between the output signal of the state-feedback circuit and the input signal.

18 Claims, 8 Drawing Sheets

(56) References Cited

OTHER PUBLICATIONS

P. Fankhauser and C. Gwerder, "Modeling and control of a ballbot," Bachelor's thesis, Eidgenssische Technische Hochschule Zrich, 2010.
J. Fong and S. Uphill, "Design and build a ballbot," Report, University of Adelaide, 2009.
J. Gadewadikar, F. Lewis. K. Subbarao. K. Peng, and B. Chen, "H-infinity static output-feedback control for rotorcraft,"•Journal of Intelligent and Robotic Systems, vol. 54, No. 4 pp. 629-646, 2009.
D. Kamen, R. Ambrogi, R. Duggan, J. Field, R. Heinzmann, B. Amesbury, and C. Langenfeld, "Personal mobility vehicles and methods," U.S. Pat. No. 6,302,230B1.
M. Kumagai and T. Ochiai, "Development of a robot balancing on a ball," in IEEE International Conference on Control, Automation and Systems, 2008, pp. 433-438.
M. La Civita, G. Papageorgiou.W. Messner, and T. Kanade, "Design and flight testing of a high-bandwidth h-infinity loop shaping controller for a robotic helicopter," in AIAA Guidance. Navigation, and Control Conference and Exhibit, 2002, p. 4836.
T. Lauwers, G. Kantor, and R. Hollis. "A dynamically stable single-wheeled mobile robot with inverse mouse-ball drive," in Proceedings of IEEE International Conference on Robotics and Automation, 2006.
S. Lin, C. Tsai, and H. Huang, "Adaptive robust self-balancing and steering of a two-wheeled human transportation vehicle," Journal of Intelligent & Robotic Systems, vol. 62, No. 1, pp. 103-123, 2011.
S. Mason, L. Righetti, and S. Schaal, "Full dynamics lqr control of a humanoid robot: An experimental study on balancing and squatting," in IEEE-RAS International Conference on Humanoid Robots, 2014, pp. 374-379.
Segway, Inc., "Segway i2 SE Personal Transporter," http://www.segway.com/products/professional/segway-i2-se.
B. Stephens, "Integral control of humanoid balance." in IEEE/RSJ International Conference on Intelligent Robots and Systems, 2007, pp. 4020-4027.
T. Sugie and M. Okada,•"Iterative Controller Design Method on Closed-Loop Identification," in Proceedings of the 3rd ECC, vol. 2, 1995, pp. 1243-1248.
C. Tsai, H. Huang, and S. Lin, "Adaptive neural network control of a self-balancing two-wheeled scooter." IEEE transactions on industrial electronics, vol. 57, No. 4, pp. 1420-1428, 2010.
M. Vukobratovi and B. Borovac, "Zero-moment pointthirty five years of its life," International journal of humanoid robotics, vol. 1, No. 1, pp. 157-173, 2004.
K. Yamane and J. Hodgins, "Simultaneous tracking and balancing of humanoid robots for imitating human motion capture data," in Proceedings of IEEE/RSJ International Conference on Intelligent Robot Systems, St. Louis, MO, Oct. 2009, pp. 2510-2517.
K. Yamane, Y. Nakamura, M. Okada, N. Komine, and K. Yoshimoto, "Parallel Dynamics Computation and H∞ Acceleration Control of Parallel Manipulators for Acceleration Display," ASME Journal of Dynamic System, Measurement, and Control, vol. 127. pp. 185-191, Jun. 2005.
J. Yeon and J. Park, "Practical robust control for flexible joint robot manipulators," in Proceedings of IEEE International Conference on Robotics and Atromation, 2008, pp. 3377-3382.
International Search Report and Written Opinion of PCT/US2019/051027 dated Dec. 4, 2019, 7 pages.

* cited by examiner

STABLE BALANCE CONTROLLER

CROSS-REFERENCE TO RELATED APPLICATIONS

This application claims the benefit of U.S. Provisional Patent Application, Ser. No. 62/731,290, filed on Sep. 14, 2018; the entirety of the above-noted application(s) is incorporated by reference herein.

BACKGROUND

Mobile robots with an unstable equilibrium state may have to continuously balance while standing and moving. Examples of such robots include a ballbot, two-wheeled mobile robots (e.g., robot equipped with wheels or bearings), and legged robots with up to two feet on the ground at a time. These robots may be advantageous for navigation among human pedestrians compared to statically stable robots because the changes in moving speed and direction are visible before they actually happen due to their dynamics. For example, the robot's base or the center of pressure may move in the opposite direction first to be able to start moving in a certain direction. The pedestrians around the robot can therefore predict the robot's next movement earlier than statically stable robots that may begin movement without any preparatory movements.

BRIEF DESCRIPTION

According to one aspect, a stable balance controller may include an $H^\infty$ controller, a state-feedback circuit, and a feedback loop. The $H^\infty$ controller may receive an input signal and generate a control effort signal $X_{ref}$. The state-feedback circuit may receive the control effort signal $X_{ref}$ as an input and generate an output signal. The feedback loop may include the $H^\infty$ controller and the state-feedback circuit, and may transfer the output signal of the state-feedback circuit back to the input of the $H^\infty$ controller and input a tracking error input signal to the $H^\infty$ controller. The tracking error input signal may be the difference between the output signal of the state-feedback circuit and the input signal.

The state-feedback circuit may include a first circuit A, a second circuit B, a third circuit C, an integrator circuit ∫, and a state-feedback controller L.

The second circuit B may receive the control effort signal $X_{ref}$ as an input and generate an output signal, the integrator circuit ∫ may receive the output signal of the second circuit B and generate a signal x indicative of a state of an associated robot, the third circuit C may receive the signal x and generate the output signal for the state-feedback circuit, the first circuit A may receive the signal x and generate an output signal also received by the integrator circuit ∫, and the state-feedback controller L may receive a difference between the control effort signal $X_{ref}$ and the signal x via a second feedback loop, and generate u as an input to the second circuit B.

According to one aspect, $\dot{x}=Ax+Bu$ and $y=Cx$, and x may be the signal generated by the integrator circuit ∫ and may be indicative of the state of the associated robot, y may be the output signal of the state-feedback circuit, u may be the signal generated by the state-feedback controller L, and A, B, and C may correspond to the first circuit A, the second circuit B, the third circuit C, respectively.

According to one aspect, $u=L(x_{ref}-x)$ and L may be the feedback gain of the state-feedback controller L.

According to one aspect, $S=(I+GK)^{-1}$, $R=K(I+GK)^{-1}$, and $T=GK(I+GK)^{-1}$, I may be an identity matrix, G may be the state-feedback circuit, K may be the controller, R may be indicative of control effort, S may be indicative of a sensitivity function, and T may be indicative of a complementary sensitivity function.

According to one aspect, $y_1=W_1Sv$, $y_2=W_2Rv$, $y_3=W_3Tv$, $y_1$, $y_2$, $y_3$ may be auxiliary outputs, $W_1$, $W_2$, $W_3$ may be assigned weights, and v may be the input signal received by the controller. $W_1$ may be a frequency characteristic such that when frequency=0, $$\frac{1}{W_1} < 0 \text{ dB}.$$

$W_3$ may De a frequency characteristic such that when frequency>a control cycle frequency of an associated robot, $$\frac{1}{W_3} < 0 \text{ dB}.$$

$W_3$ may be a frequency characteristic such that when frequency>a measured sensor noise frequency of an associated robot, $$\frac{1}{W_3} < 0 \text{ dB}.$$

According to one aspect, a robot may include a robot body, an actuator, and a stable balance controller. The actuator may control movement of the robot body. The stable balance controller may include an $H^\infty$ controller, a state-feedback circuit, and a feedback loop. The $H^\infty$ controller may receive an input signal and generate a control effort signal $X_{ref}$. The state-feedback circuit may receive the control effort signal $X_{ref}$ as an input and generate an output signal. The feedback loop may include the $H^\infty$ controller and the state-feedback circuit, and may transfer the output signal of the state-feedback circuit back to the input of the $H^\infty$ controller and input a tracking error input signal to the $H^\infty$ controller. The tracking error input signal may be the difference between the output signal of the state-feedback circuit and the input signal.

The state-feedback circuit may include a first circuit A, a second circuit B, a third circuit C, an integrator circuit ∫, and a state-feedback controller L. The state-feedback circuit may include a second feedback loop nested within the feedback loop of the stable balance controller. The robot may be a ballbot.

According to one aspect, a control system for providing stable balance control may include an $H^\infty$ controller, a state-feedback circuit, and a feedback loop. The $H^\infty$ controller may receive an input signal and generate a control effort signal $X_{ref}$. The state-feedback circuit may receive the control effort signal $X_{ref}$ as an input and generate an output signal. The feedback loop may include the $H^\infty$ controller and the state-feedback circuit, and may transfer the output signal of the state-feedback circuit back to the input of the $H^\infty$ controller and input a tracking error input signal to the $H^\infty$ controller. The tracking error input signal may be the difference between the output signal of the state-feedback circuit and the input signal. The state-feedback circuit may include a second feedback loop nested within the feedback loop of the control system for providing stable balance control.

The state-feedback circuit may include a first circuit A, a second circuit B, a third circuit C, an integrator circuit $\int$, and a state-feedback controller L. The second circuit B may receive the control effort signal $X_{ref}$ as an input and generate an output signal, the integrator circuit $\int$ may receive the output signal of the second circuit B and generate a signal x indicative of a state of an associated robot, the third circuit C may receive the signal x and generate the output signal for the state-feedback circuit, the first circuit A may receive the signal x and generate an output signal also received by the integrator circuit $\int$, and the state-feedback controller L may receive a difference between the control effort signal $X_{ref}$ and the signal x via a second feedback loop, and generate u as an input to the second circuit B.

According to one aspect, $\dot{x}=Ax+Bu$ and $y=Cx$, x may be the signal generated by the integrator circuit $\int$ and may be indicative of the state of the associated robot, y may be the output signal of the state-feedback circuit, u may be the signal generated by the state-feedback controller L, and A, B, and C may correspond to the first circuit A, the second circuit B, the third circuit C, respectively.

According to one aspect, $u=L(x_{ref}-x)$, and L may be the feedback gain of the state-feedback controller L. According to one aspect, $S=(I+GK)^{-1}$, $R=K(I+GK)^{-1}$, and $T=GK(I+GK)^{-1}$, I may be an identity matrix, G may be the state-feedback circuit, K may be the $H^\infty$ controller, R may be indicative of control effort, S may be indicative of a sensitivity function, and T may be indicative of a complementary sensitivity function.

DETAILED DESCRIPTION

As used herein, a 'robot' may be a machine, such as one programmable by a computer, and capable of carrying out a complex series of actions automatically. A robot may be guided by an external control device or the control may be embedded within a controller. It will be appreciated that a robot may be designed to perform a task with no regard to appearance. Therefore, a 'robot' may include a machine which does not necessarily resemble a human, including a vehicle, a device, a flying robot, a manipulator, a robotic arm, etc.

According to one aspect, a controller for providing stable balance control is provided herein. In other words, the controller may enable a robot to self-balance, while operating and making agile collision avoidance maneuvers across different environment conditions (e.g., different floor conditions, materials, or uneven conditions). The controller may include two feedback loops: an inner circuitry loop providing basic balancing and tracking capabilities using a state-feedback controller, while an outer circuitry loop applies $H^\infty$ control to improve the robustness against varying floor conditions associated with different floor materials and uneven surfaces. By applying $H^\infty$ control to a stable closed-loop system, black-box system identification may be performed to obtain a more realistic system model.

The inner circuitry loop may include a state-feedback circuit 130 receiving a reference equilibrium state and generating a first balance and tracking capability and the outer circuitry loop may include an $H^\infty$ circuit or controller receiving a reference output from the inner circuitry loop and generating the reference state for the state-feedback circuit 130. The controller for providing stable balance control may be designed to minimize the $H^\infty$ norm (e.g., maximum gain at all frequencies) of a transfer function from the input to the auxiliary outputs, as will be described below.

For example, if a ballbot is used as a control target, it may be demonstrated that the controller realizes high responsiveness and robustness on various floor materials including linoleum, carpet and slope, as well as in environments including uneven terrains including bumps and slopes. The performance of stable balance controllers described herein are found to be more robust and efficient against other design choices that focus on initial reaction and/or robustness. In this way, a stable, quick response, robust, closed loop system may be provided and system identification becomes possible. Without this configuration, one or more of the auxiliary outputs may become unstable, and system identification may not be possible.

Figure 1:
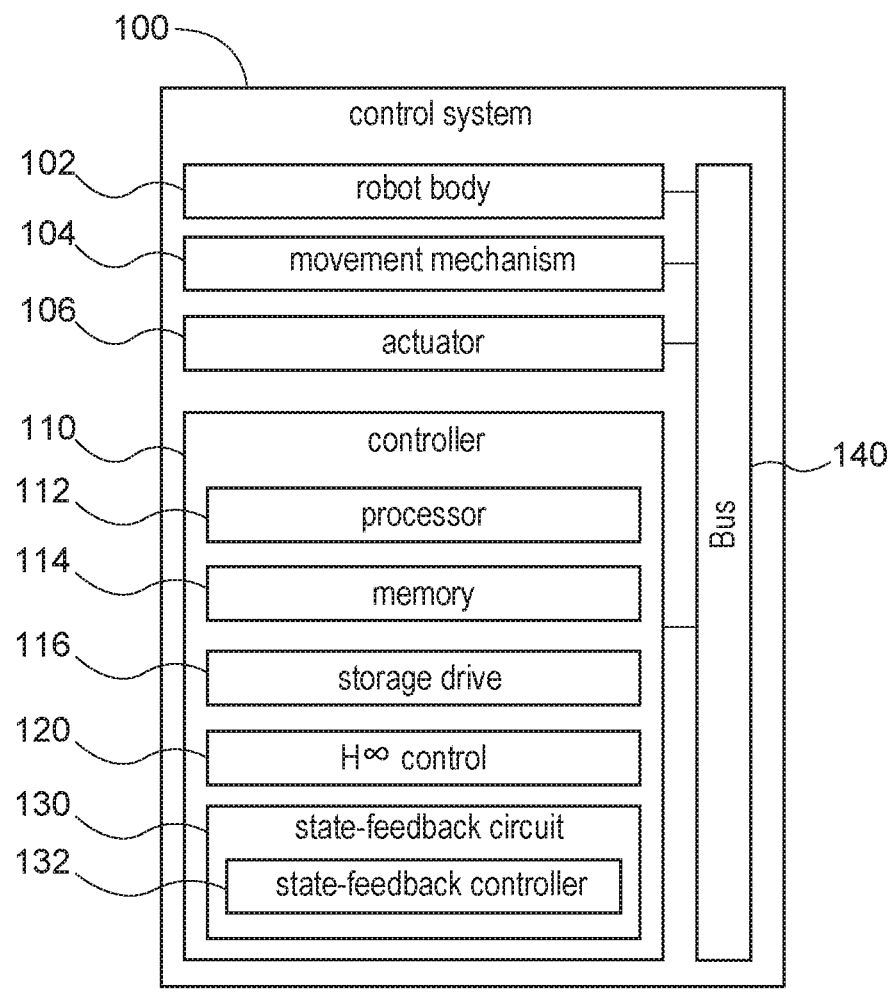
FIG. 1 is a component diagram of a control system for providing stable balance control, according to one aspect.

FIG. 1 is a component diagram of a control system 100 for providing stable balance control, according to one aspect. The control system 100 for providing stable balance control may include a robot body 102, a movement mechanism 104 (e.g., a ball of a ballbot or wheels of the robot), an actuator 106, and a controller 110 for providing stable balance control. The controller may include a processor 112, a memory 114, a storage drive 116, an $H^\infty$ controller 120, and a state-feedback circuit 130 including a state-feedback controller 132, and a bus 140 interconnecting one or more of the aforementioned components.

Figure 2:
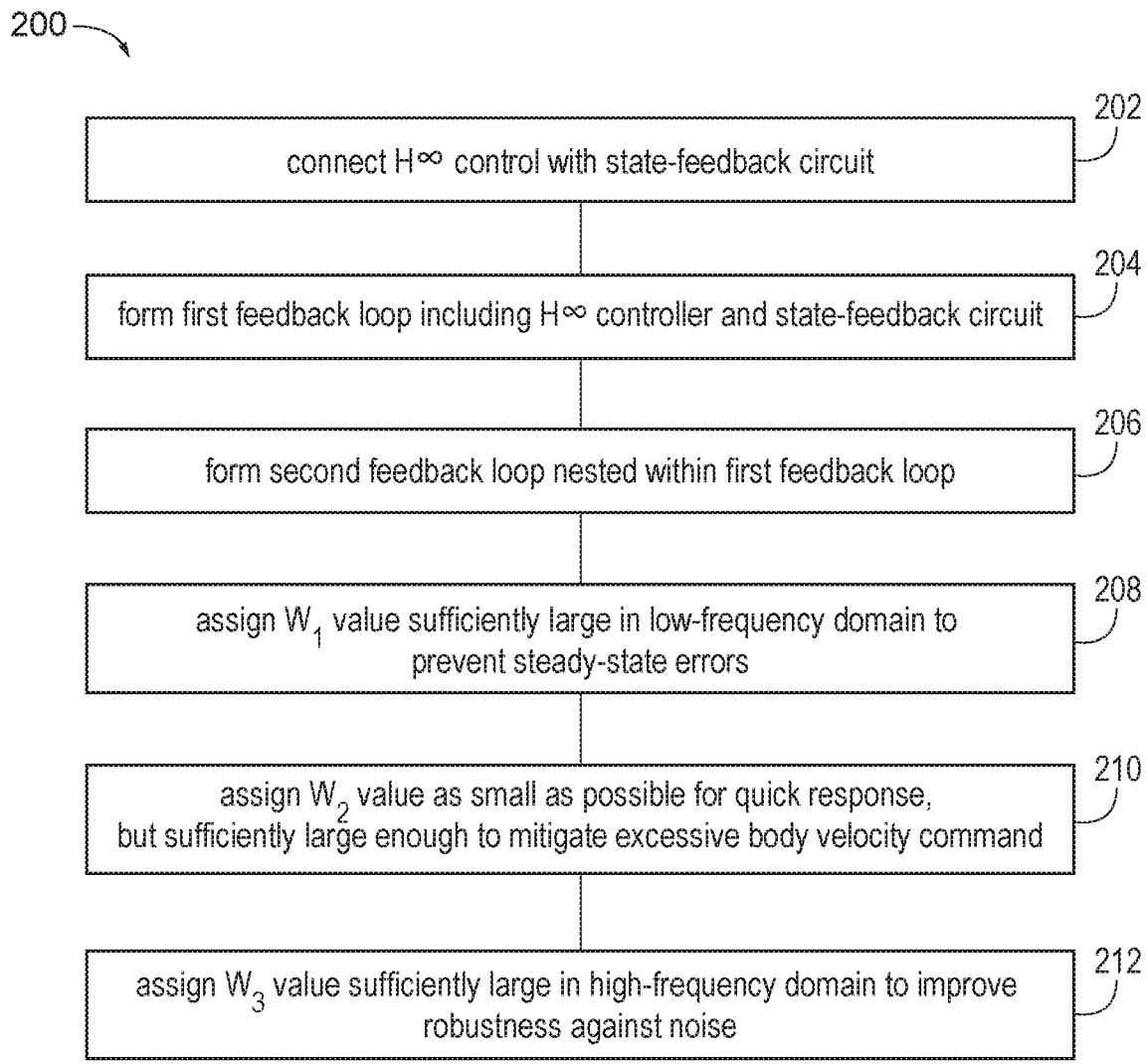
FIG. 2 is a flow diagram of a method for providing stable balance control, according to one aspect.

FIG. 2 is a flow diagram of a method 200 for providing stable balance control, according to one aspect. The method 200 may include implementing a controller by connecting 202 an $H^\infty$ controller receiving an input signal and generating a control effort signal $X_{ref}$ with a state-feedback circuit, forming a first feedback loop 204, including the $H^\infty$ controller and the state-feedback circuit, transferring the output signal of the state-feedback circuit back to the input of the $H^\infty$ controller and inputting a tracking error input signal to the $H^\infty$ controller, forming a second feedback loop 206 nested within the first feedback loop of the controller for providing stable balance control, assigning $W_1$ 208 a value sufficiently large in the low-frequency domain to prevent steady-state errors, assigning $W_2$ 210 a value as small as possible to enable a quick response, but sufficiently large enough to mitigate excessive body velocity command to the state-feedback controller 132, and assigning $W_3$ 212 a value sufficiently large in the high-frequency domain to improve the robustness against noise.

Figure 3:
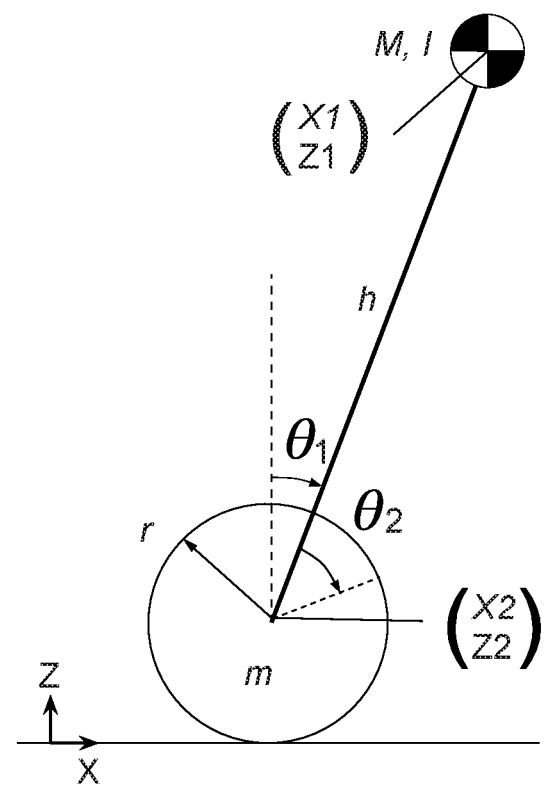
FIG. 3 is an exemplary planar model of a robot implementing the stable balance controller of FIG. 1, according to one aspect.

FIG. 3 is an exemplary planar model of a ballbot 300 implementing the stable balance controller 110 of FIG. 1, according to one aspect. With reference to the ballbot 300:

M: mass of the robot body 102
I: moments of inertia of the robot body 102
m: mass of the ball or movement mechanism 104
r: radius of the ball
h: distance between the robot body 102 center of mass and ball center
θ1: inclination angle of the robot body 102
θ2: rotation angle of the ball relative to the robot body 102
where $$\begin{pmatrix} x_1 \\ z_1 \end{pmatrix} \text{ and } \begin{pmatrix} x_2 \\ z_2 \end{pmatrix}$$

are coordinates associated with the robot body 102 center of mass and ball center, respectively.

The ballbot 300 may make three-dimensional movements on a surface using actuators 106 driving the movement mechanism 104 or ball. For example, the input to the ballbot 300 model may be ball acceleration, which may be integrated and converted to velocity commands for the actuators 106. The motions or maneuvers taken by the ballbot 300 (e.g., x, y, yaw) may be independent. The controller may calculate a yaw velocity command $\omega_{cmd}$ based on:

$$\omega_{cmd} = \omega_{ref} + k_p(\omega_{ref} - \omega) + k_i \int(\omega_{ref} - \omega)dt - k_d \dot{\omega}$$

where $\omega_{ref}$ and $\omega$ are reference yaw velocity and actual yaw velocity, respectively, and where $k_p$, $k_i$, $k_d$ are the proportional, integral, and derivative gains, respectively. Although merely the x direction is illustrated in FIG. 3, the planar model may be applicable to the y direction separately as well.

According to one aspect, the positions of the robot body 102 and the ball may be expressed as:

$$\begin{pmatrix} x_1 \\ z_1 \end{pmatrix} = \begin{pmatrix} r(\theta_1 + \theta_2) + h\sin(\theta_1) \\ r + h\cos(\theta_1) \end{pmatrix}$$

$$\begin{pmatrix} x_2 \\ z_2 \end{pmatrix} = \begin{pmatrix} r(\theta_1 + \theta_2) \\ r \end{pmatrix},$$

which may be utilized to derive the Lagrangian L. Because no external force is applied to the robot body 102:

$$\frac{d}{dt}\frac{\partial L}{\partial \dot{\theta}_1} - \frac{\partial L}{\partial \theta_1} = 0$$

Based on the above, and using $\theta_1 \approx 0$ and $\dot{\theta}_1 \approx 0$:

$$\ddot{\theta}_1 = a\theta_1 - b\ddot{\theta}_2, \text{ where}$$

$$a = \frac{Mgh}{2 + M(r+h)^2 + mr^2},$$

$$b = \frac{Mr(r+h) + mr^2}{I + M(r+h)^2 + mr^2},$$

$$\ddot{x}_1 = r(\ddot{\theta}_1 + \ddot{\theta}_2) + h\ddot{\theta}_1 \cos\theta_1 - \dot{\theta}_1^2 \sin\theta_1,$$

again using $\theta_1 \approx 0$ and $\dot{\theta}_1 \approx 0$:

$$\ddot{x}_1 = (r+h)\ddot{\theta}_1 + r\ddot{\theta}_2$$

Thus, the state-space representation may be:

$$\dot{x} = \begin{pmatrix} 0 & 1 & 0 \\ a & 0 & 0 \\ a(r+h) & 0 & 0 \end{pmatrix} x + \begin{pmatrix} 0 \\ -b \\ r-(r+h)b \end{pmatrix} u; \text{ or}$$

$$\dot{x} = Ax + Bu$$

where $x = (\theta_1 \dot{\theta}_1 \dot{x}_1)^T$ and $u = \ddot{\theta}_2$

Here, all three states may be measured (e.g., y=x) and C may be a 3×3 identity matrix.

Figure 4:
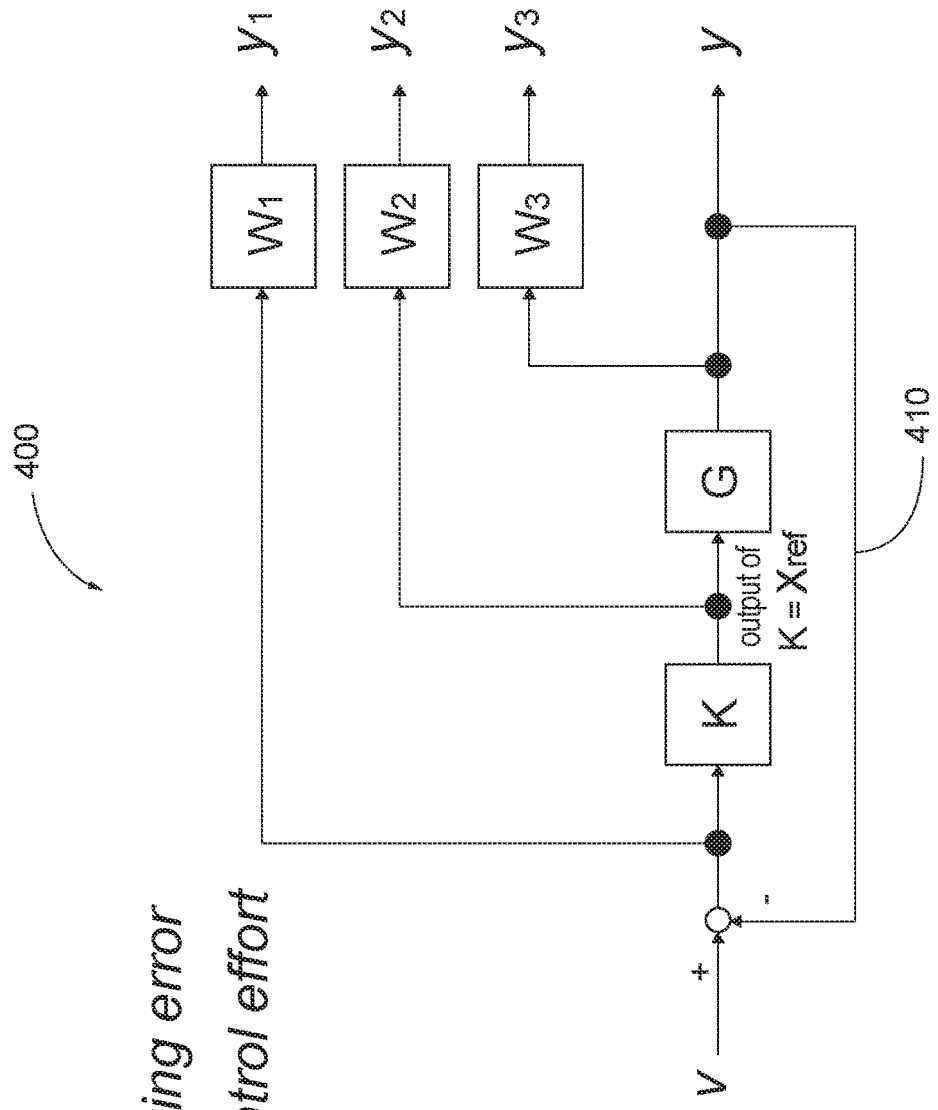
FIG. 4 is a component diagram of a stable balance controller, according to one aspect.

FIG. 4 is a component diagram 400 of a stable balance controller 110 and/or control system thereof, according to one aspect. In FIG. 4, the stable balance controller 110 may be arranged to include the $H^\infty$ controller 120 (K) in series with the state-feedback circuit 130 (G). The $H^\infty$ controller 120 and the state-feedback circuit 130 may be configured as part of a feedback loop (e.g., a first feedback loop 410). As seen in FIG. 4, an input signal v may be received by the controller, and more specifically, at an input of the $H^\infty$ controller 120. The input signal v may be any reference signal, such as velocity, angular velocity, or a body angle $\theta_1$ of the robot, for example. Thus, the $H^\infty$ controller 120 may receive the input signal v. The $H^\infty$ controller 120 may generate an output signal, such as a control effort signal $X_{ref}$, based on the input signal v. The control effort signal $X_{ref}$ may be received at an input of the state-feedback circuit 130, which will be described in greater detail with reference to FIG. 5 below, and may include a second feedback loop (shown in FIG. 5) nested within the first feedback loop 410 of the stable balance controller 110. The state-feedback circuit 130 may generate an output signal y based on the control effort signal $X_{ref}$.

The feedback loop (e.g., first feedback loop 410) may be implemented to include the $H^\infty$ controller 120 and the state-feedback circuit 130. Specifically, the feedback loop may transfer the output signal y of the state-feedback circuit 130 back to the input of the $H^\infty$ controller 120 and input a tracking error input signal to the $H^\infty$ controller 120. As seen in FIG. 4, the tracking error input signal may be the difference between the output signal y of the state-feedback circuit 130 and the input signal v. The stable balance controller 110 of FIG. 4 may be implemented within a robot to control movement of a robot body 102 of the robot. Additionally, the stable balance controller 110 may be combined with other types of controllers, such as a pedestrian or object avoidance controller to achieve agile collision avoidance behaviors in crowded environments. As discussed above, the robot may be a ballbot, for example. The output signal y may be utilized by a controller of a robot to drive or operate an actuator 106 associated with a movement mechanism 104 for the robot, according to one aspect. In this way, the actuator 106 may control movement of the robot body 102.

As seen in FIG. 4, the tracking error input signal is $y_1$ the control effort signal is $y_2$, and the output signal $y_3$=y. Weights $W_1$, $W_2$, $W_3$ may be assigned during design of the stable balance controller 110 to facilitate efficiency and robustness of the controller. Specifically, $y_1$, $y_2$, $y_3$ may be auxiliary outputs, $W_1$, $W_2$, $W_3$ may be assigned weights, and v may be the input signal received by the $H^\infty$ controller 120, where $y_1 = W_1 Sv$, $y_2 = W_2 Rv$, and $y_3 = W_3 Tv$.

According to one aspect, one or more of the weights $W_1$, $W_2$, $W_3$ may be adjusted or determined during a design phase for the stable balance controller 110, while aiming to improve the controller performance in terms of steady-state error and robustness without sacrificing the response time of the state-feedback controller 132.

A larger weight $W_1$, $W_2$, $W_3$ indicates that the response of the corresponding quantity should be smaller. For example, $W_1^{-1}$ may be chosen to have a smaller gain at low frequencies to reduce the steady-state error and a larger gain at high frequency to mitigate the effect of noise. In this way, $H^\infty$ control may be implemented to minimize the $H^\infty$ norm of the auxiliary outputs $y_1$, $y_2$, $y_3$ by using a feedback controller in the $H^\infty$ controller 120 (K).

In this regard, $W_1$ may be assigned a value sufficiently large in the low-frequency domain to prevent steady-state errors, $W_2$ may be assigned a value as small as possible to enable a quick response, but sufficiently large enough to mitigate excessive body velocity command to the state-feedback controller 132, and $W_3$ may be assigned a value sufficiently large in the high-frequency domain to improve the robustness against noise.

For example, $W_3$ may be assigned a value such that in the high-frequency domain, noise is below a threshold amount. In other words, according to this architecture, the robustness is prioritized reducing the gain in the high-frequency domain, by adjusting the $H^\infty$ weights (e.g., $W_1$, $W_2$, $W_3$). According to one aspect, $W_2^{-1}$ may be selected to have smaller gains in the high-frequency domain, thereby causing the output gain to drop at higher frequencies, which may slow initial response time.

According to one aspect, a low-pass filter may be applied to the v command signal and/or the output signal y. The former filter may mitigate excessively demanding commands from passing into the controller, and the latter may remove high-frequency noise from the sensor signals. Further, by adjusting a time constant of a low-pass filter applied to $X_{ref}$, delayed response times may be mitigated. In this way, designing robust controllers for self-balancing mobile robots moving in variable environment may be provided.

Figure 5:
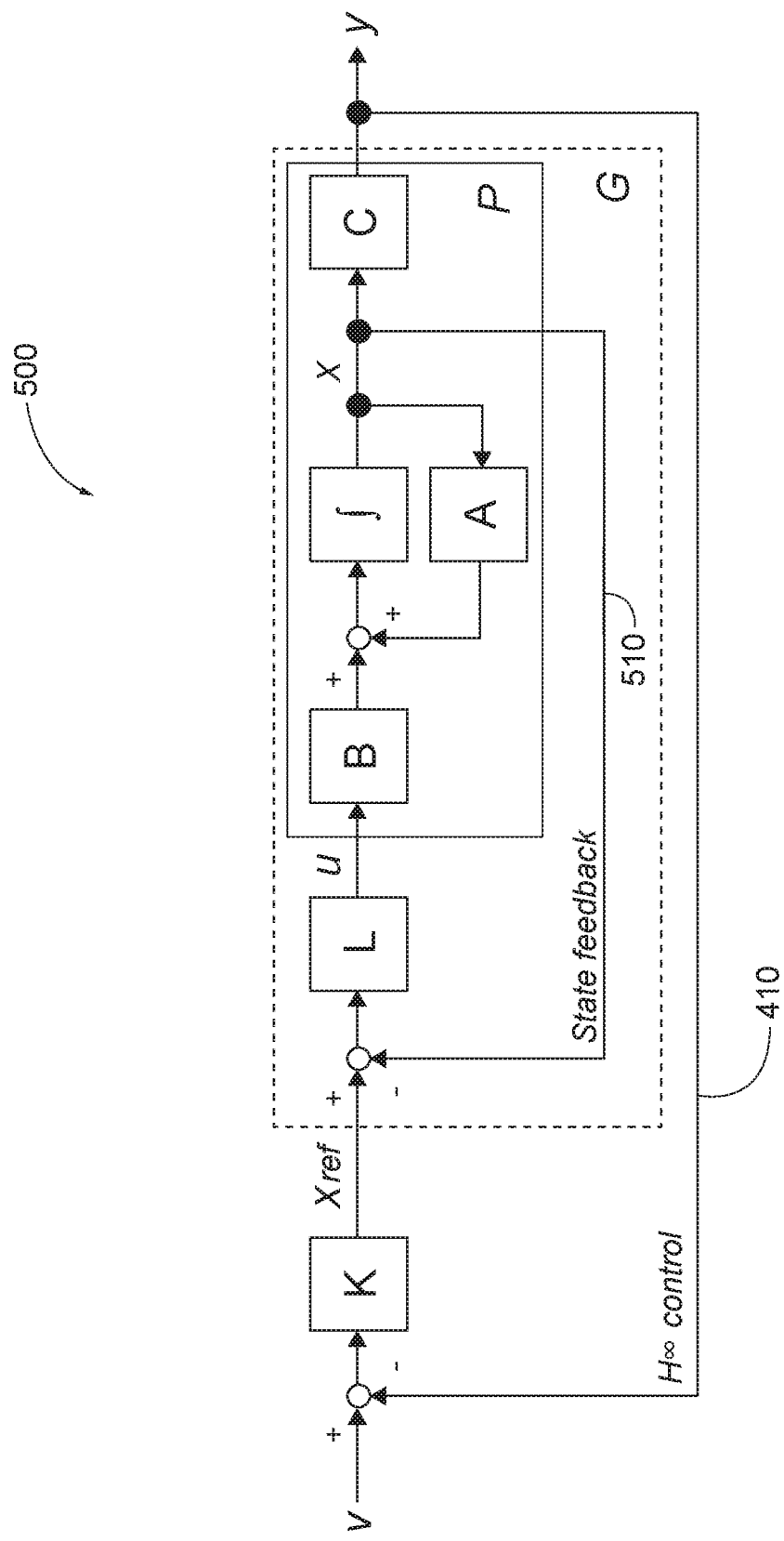
FIG. 5 is a component diagram of a stable balance controller, in greater detail, according to one aspect.

FIG. 5 is a component diagram 500 of a stable balance controller 110 or control system 100 for providing stable balance control, illustrated in greater detail, according to one aspect. In FIG. 5, it may be seen that the state-feedback circuit 130 (G) includes a first circuit A, a second circuit B, a third circuit C, an integrator circuit $\int$, and a state-feedback controller 132 L. P may be denoted as a control target (e.g., the model of the robot, ballbot, or actuator 106 associated therewith). Additionally, the state-feedback circuit 130 may include a second feedback loop 510 including the control target P and the state-feedback controller 132 L. The second feedback loop 510 may be nested within the first feedback loop 410 of the stable balance controller 110 or associated control system. By having the second feedback loop 510 and the state-feedback circuit 130 inside the $H^\infty$ control loop (e.g., the first feedback loop 410), system identification may be performed, and the controller be designed to be based on the actual system, rather than a theoretical model.

Within the control target P, the state-feedback controller 132 L may receive a difference between the control effort signal $X_{ref}$ and the signal x via the second feedback loop 510, and generate u as an input to the second circuit B. The second circuit B may generate an output signal. The integrator circuit $\int$ may receive the output signal of the second circuit B and generate a signal x indicative of a state of an associated robot. The third circuit C may receive the signal x and generate the output signal y for the state-feedback circuit 130. As previously discussed, output signal y may be utilized to drive or operate an actuator 106 associated with a movement mechanism 104 for the robot and may be transferred, via the first feedback loop 410, back to the input of the $H^\infty$ controller 120 (K).

Additionally, returning to the signal x, this state signal may be received by the first circuit A as an input. The first circuit A may generate an output signal which may be also received by the integrator circuit $\int$, in addition to the output signal of the second circuit B (e.g., as a sum of the two signals). The state-feedback controller L may receive a difference between the control effort signal $X_{ref}$ and the signal x via the second feedback loop 510. In this way, the state-feedback controller 132 L may generate a feedback gain signal based on the state signal x and the control effort signal $X_{ref}$. Due to the configuration of the second feedback loop 510, the feedback gain signal may be input as a signal u to the second circuit B. Here, the signal u is the signal generated by the state-feedback controller L.

Thus, x may be the signal generated by the integrator circuit $\int$ and may be indicative of the state of the associated robot, y may be the output signal of the third circuit C of the state-feedback circuit 130, u may be the signal generated by the state-feedback controller L, and may be the input to the second circuit B. $X_{ref}$ represents the reference state.

For the state-feedback circuit 130, the control target P may be represented or modeled as a linear, time-invariant (LTI) system, represented by the following state-space equation:

$$\dot{x} = Ax + Bu; \text{ and}$$

$$y = Cx,$$

where A, B, and C correspond to the first circuit A, the second circuit B, the third circuit C, respectively, and where x represents the state of the robot, u is the input signal to the control target P, and y represents the output signal for the state-feedback circuit 130.

The stable balance controller 110 may be implemented for robots which may be unstable around their equilibrium (e.g., one or more poles of their transfer function have positive real parts). The transfer function may be represented as:

$$y = C(sI - A)^{-1} Bu, \text{ where } I \text{ is an identity matrix.}$$

Because a controller implementing $H^\infty$ directly based on the above may result in an unstable transfer function from the input to the control effort, and because system identification may not be possible due to this instability, theoretical models based on an ideal floor condition assuming no slip or drag were previously used. In this regard, the state-feedback circuit 130 may be designed based on:

$$u = L(x_{ref} - x), \text{ where } L \text{ is the feedback gain of the state-feedback controller 132 } L.$$

Further, a stable system may be designed based on:

$$\dot{x} = (A - BL)x + BL x_{ref}$$

According to one aspect, L may be computed by pole placement. Other techniques, such as, linear quadratic regulator (LQR) may also be utilized according to other aspects.

For the $H^\infty$ controller 120 (K):

$$S = (I + GK)^{-1},$$

$$R = K(I + GK)^{-1}, \text{ and}$$

$$T = GK(I + GK)^{-1},$$

I is an identity matrix,
G is the state-feedback circuit 130,
K is the H$^\infty$ controller 120,
S is indicative of a sensitivity function,
R is indicative of control effort, and
T is indicative of a complementary sensitivity function.

Figure 6:
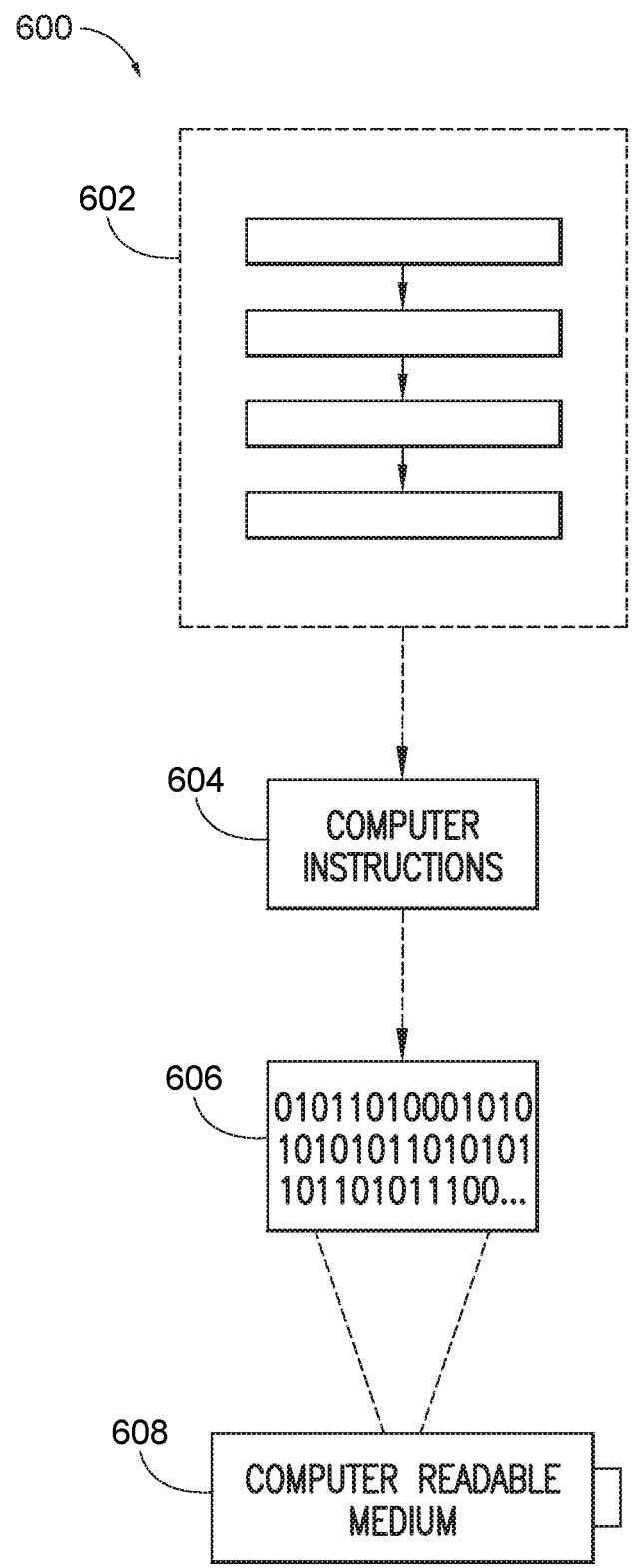
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 200 of FIG. 2. In another aspect, the processor-executable computer instructions 604 may be configured to implement a system, such as the system 100 of FIG. 1, the robot 300 of FIG. 3, the system 400 of FIG. 4, the system 500 of FIG. 5. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
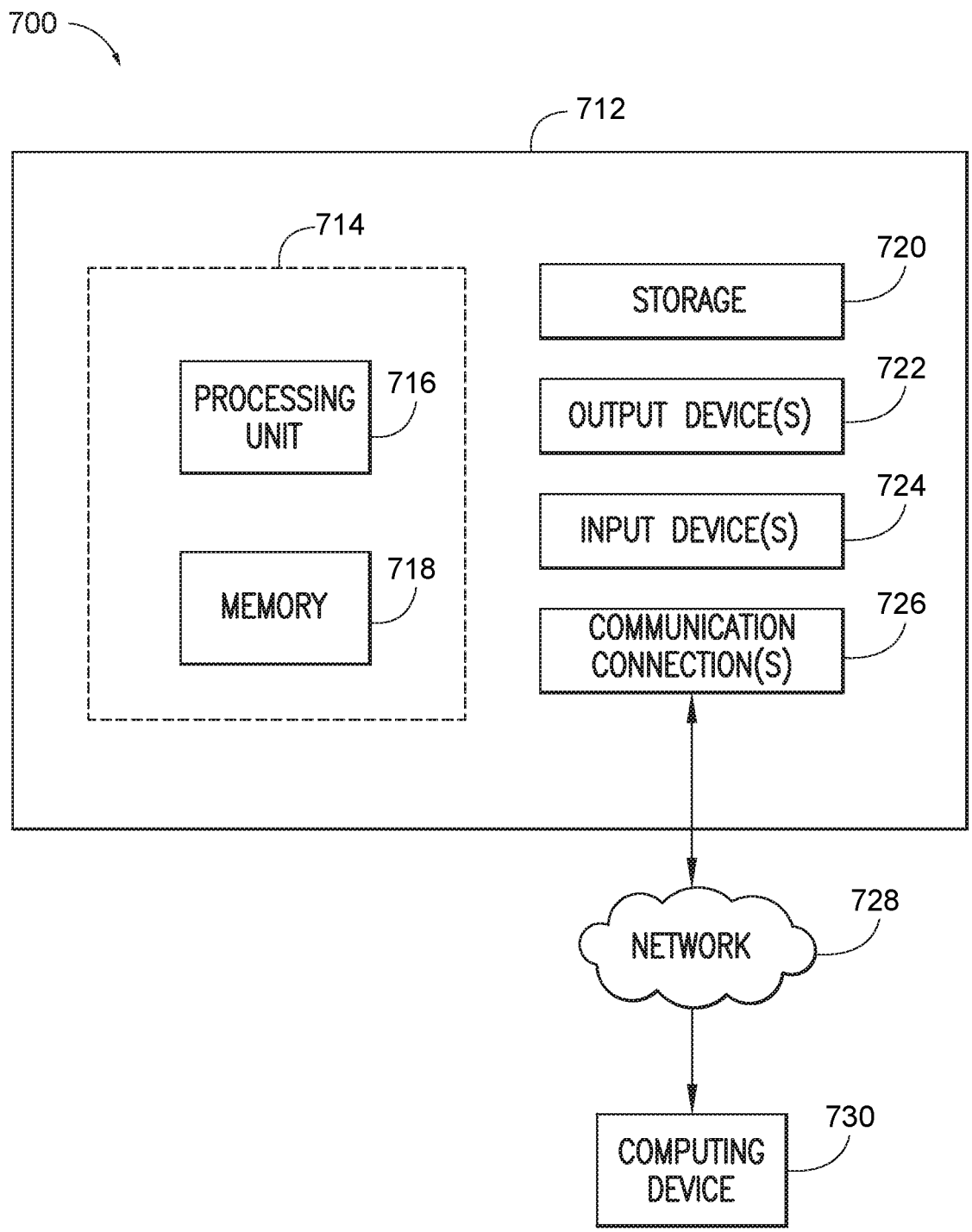
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Figure 8:
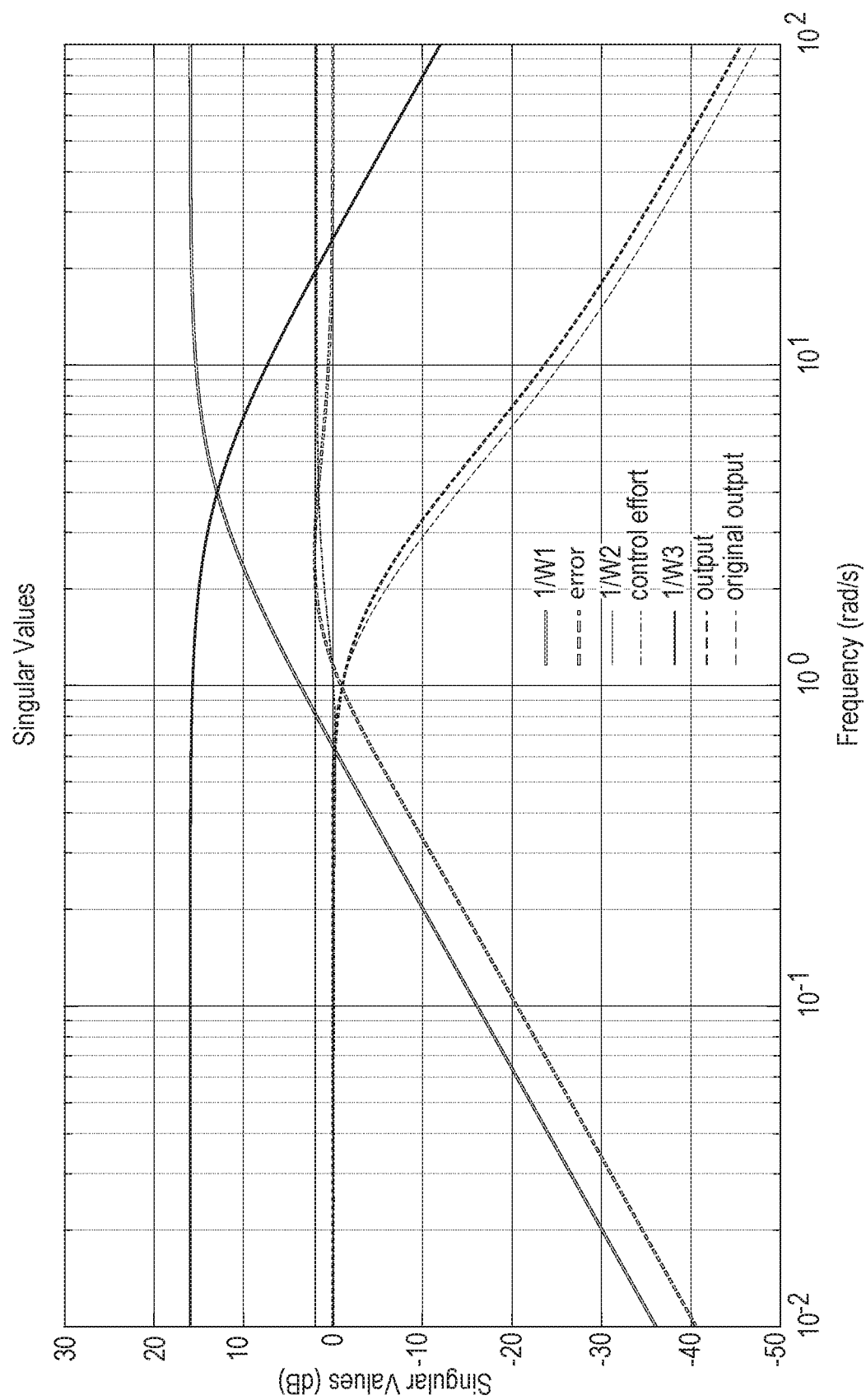
FIG. 8 is an exemplary graph in association with selection of one or more weights in designing a stable balance controller, according to one aspect.

FIG. 8 is an exemplary graph in association with selection of one or more weights in designing a stable balance controller, according to one aspect. $W_1$ may be a frequency characteristic selected during design such that when the frequency=0 (e.g., along the x-axis of the graph of FIG. 8), $$\frac{1}{W_1} < 0 \text{ dB}$$

(e.g., along the y-axis of the graph of FIG. 8). According to one aspect, $W_3$ is a frequency characteristic selected such that when the frequency is greater than (>) a control cycle frequency of an associated robot, $$\frac{1}{W_3} < 0 \text{ dB}.$$

According to another aspect, $W_3$ is a frequency characteristic selected such that when the frequency is greater than (>) a measured sensor noise frequency of an associated robot, $$\frac{1}{W_3} < 0 \text{ dB}.$$

Further, according to one exemplary scenario, high frequency may be defined as a frequency greater than an intersection between the $$\frac{1}{W_3} \text{ and the } \frac{1}{W_1}$$

curves, as seen in FIG. 8. Further, in this example, low frequency may be defined as a frequency less than the intersection point between the $$\frac{1}{W_3} \text{ and the } \frac{1}{W_1}$$

curves of FIG. 8. However, because $W_1$, $W_2$, $W_3$ may be selected by a circuit designer, there may be some variation among different weights $W_1$, $W_2$, $W_3$.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A stable balance controller, comprising:
a controller receiving an input signal and generating a control effort signal $X_{ref}$;
a state-feedback circuit receiving the control effort signal $X_{ref}$ as an input and generating an output signal; and
a feedback loop, including the controller and the state-feedback circuit, transferring the output signal of the state-feedback circuit back to the input of the controller and inputting a tracking error input signal to the controller,
wherein the tracking error input signal is the difference between the output signal of the state-feedback circuit and the input signal,
wherein the stable balance controller drives an actuator controlling movement of a robot body based on the output signal of the state-feedback circuit,
wherein:

$S=(I+GK)^{-1}$, $R=K(I+GK)^{-1}$, $T=GK(I+GK)^{-1}$, $y_1=W_1 Sv$, $y_2=W_2 Rv$, and $y_3=W_3 Tv$, wherein I is an identity matrix,
wherein G is the state-feedback circuit,
wherein K is the controller,
wherein R is indicative of control effort,
wherein S is indicative of a sensitivity function,
wherein T is indicative of a complementary sensitivity function, wherein $y_1$, $y_2$, $y_3$ are auxiliary outputs, $W_1$, $W_2$, $W_3$ are assigned weights, and v is the input signal received by the controller, wherein one or more weights of the weights $W_1$, $W_2$, $W_3$ associated with one or more of the auxiliary outputs $y_1$, $y_2$, $y_3$ is assigned based on having a smaller gain at low frequencies to reduce the steady-state error and a larger gain at high frequency to mitigate the effect of noise, wherein one or more of the auxiliary outputs $y_1$, $y_2$, $y_3$ is associated with the control effort, the sensitivity function, or the complementary sensitivity function, and wherein a circuit of the feedback loop generates the auxiliary outputs $y_1$, $y_2$, $y_3$.

2. The stable balance controller of claim 1, wherein the state-feedback circuit includes a first circuit A, a second circuit B, a third circuit C, an integrator circuit $\int$, and a state-feedback controller L.

3. The stable balance controller of claim 2, wherein:
the second circuit B receives the control effort signal $X_{ref}$ as an input and generates an output signal,
the integrator circuit $\int$ receives the output signal of the second circuit B and generates a signal x indicative of a state of an associated robot,
the third circuit C receives the signal x and generates the output signal for the state-feedback circuit,
the first circuit A receives the signal x and generates an output signal also received by the integrator circuit $\int$, and
the state-feedback controller L receives a difference between the control effort signal $X_{ref}$ and the signal x via a second feedback loop, and generates u as an input to the second circuit B.

4. The stable balance controller of claim 3, wherein:

$$\dot{x}=Ax+Bu;\text{ and}$$

$$y=Cx,$$

wherein x is the signal generated by the integrator circuit $\int$ and is indicative of the state of the associated robot,
wherein y is the output signal of the state-feedback circuit,
wherein u is the signal generated by the state-feedback controller L, and
wherein A, B, and C correspond to the first circuit A, the second circuit B, the third circuit C, respectively.

5. The stable balance controller of claim 4, wherein:

$$u=L(x_{ref}-x),\text{ and}$$

wherein L is the feedback gain of the state-feedback controller L.

6. The stable balance controller of claim 1, wherein $W_1$ is a frequency characteristic such that when frequency=0, $$\frac{1}{W_1}<0\text{ dB}.$$

7. The stable balance controller of claim 1, wherein $W_3$ is a frequency characteristic such that when frequency>a control cycle frequency of an associated robot, $$\frac{1}{W_3}<0\text{ dB}.$$

8. The stable balance controller of claim 7, wherein $W_3$ is a frequency characteristic such that when frequency>a measured sensor noise frequency of an associated robot, $$\frac{1}{W_3}<0\text{ dB}.$$

9. A robot, comprising:
a robot body;
an actuator controlling movement of the robot body; and
a stable balance controller, including:
a controller receiving an input signal and generating a control effort signal $X_{ref}$;
a state-feedback circuit receiving the control effort signal $X_{ref}$ as an input and generating an output signal; and
a feedback loop, including the controller and the state-feedback circuit, transferring the output signal of the state-feedback circuit back to the input of the controller and inputting a tracking error input signal to the controller,
wherein the tracking error input signal is the difference between the output signal of the state-feedback circuit and the input signal,
wherein the stable balance controller drives the actuator to control movement of the robot body based on the output signal of the state-feedback circuit,
wherein:

$$S=(I+GK)^{-1},$$

$$R=K(I+GK)^{-1},$$

$$T=GK(I+GK)^{-1},$$

$$y_1=W_1Sv,$$

$$y_2=W_2 Rv,\text{ and}$$

$$y_3=W_3 Tv,$$

wherein I is an identity matrix,
wherein G is the state-feedback circuit,
wherein K is the controller,
wherein R is indicative of control effort,
wherein S is indicative of a sensitivity function,
wherein T is indicative of a complementary sensitivity function,
wherein $y_1$ $y_2$, $y_3$ are auxiliary outputs, $W_1$, $W_2$, $W_3$ are assigned weights, and v is the input signal received by the controller,
wherein one or more weights of the weights $W_1$, $W_2$, $W_3$ associated with one or more of the auxiliary outputs $y_1$ $y_2$, $y_3$ is assigned based on having a smaller gain at low frequencies to reduce the steady-state error and a larger gain at high frequency to mitigate the effect of noise,
wherein one or more of the auxiliary outputs $y_1$ $y_2$, $y_3$ is associated with the control effort, the sensitivity function, or the complementary sensitivity function, and
wherein a circuit of the feedback loop generates the auxiliary outputs $y_1$ $y_2$, $y_3$.

10. The robot of claim 9, wherein the state-feedback circuit of the stable balance controller includes a first circuit A, a second circuit B, a third circuit C, an integrator circuit $\int$, and a state-feedback controller L.

11. The robot of claim 9, wherein the state-feedback circuit includes a second feedback loop nested within the feedback loop of the stable balance controller.

12. The robot of claim 9, wherein the robot is a ballbot.

13. A control system for providing stable balance control, comprising:
- a controller receiving an input signal and generating a control effort signal $X_{ref}$;
- a state-feedback circuit receiving the control effort signal $X_{ref}$ as an input and generating an output signal; and
- a feedback loop, including the controller and the state-feedback circuit, transferring the output signal of the state-feedback circuit back to the input of the controller and inputting a tracking error input signal to the controller,
- wherein the tracking error input signal is the difference between the output signal of the state-feedback circuit and the input signal, and
- wherein the state-feedback circuit includes a second feedback loop nested within the feedback loop of the control system for providing stable balance control,
- wherein the control system for providing stable balance control drives an actuator controlling movement of a robot body based on the output signal of the state-feedback circuit,
- wherein:

$S=(I+GK)^{-1}$, $R=K(I+GK)^{-1}$, and $T=GK(I+GK)^{-1}$, $y_1=W_1 Sv$, $y_2=W_2 Rv$, and $y_3=W_3 Tv$, wherein I is an identity matrix,
wherein G is the state-feedback circuit,
wherein K is the controller,
wherein R is indicative of control effort,
wherein S is indicative of a sensitivity function,
wherein T is indicative of a complementary sensitivity function,
wherein $y_2$, $y_3$ are auxiliary outputs, $W_1$, $W_2$, $W_3$ are assigned weights, and v is the input signal received by the controller,
wherein one or more weights of the weights $W_1$, $W_2$, $W_3$ associated with one or more of the auxiliary outputs $y_1$, $y_2$, $y_3$ is assigned based on having a smaller gain at low frequencies to reduce the steady-state error and a larger gain at high frequency to mitigate the effect of noise,
wherein one or more of the auxiliary outputs $y_1$, $y_2$, $y_3$ is associated with the control effort, the sensitivity function, or the complementary sensitivity function, and
wherein a circuit of the feedback loop generates the auxiliary outputs $y_1$, $y_2$, $y_3$.

14. The control system of claim 13, wherein the state-feedback circuit includes a first circuit A, a second circuit B, a third circuit C, an integrator circuit f, and a state-feedback controller L.

15. The control system of claim 14, wherein:
- the second circuit B receives the control effort signal $X_{ref}$ as an input and generates an output signal,
- the integrator circuit $\int$ receives the output signal of the second circuit B and generates a signal x indicative of a state of an associated robot,
- the third circuit C receives the signal x and generates the output signal for the state-feedback circuit,
- the first circuit A receives the signal x and generates an output signal also received by the integrator circuit $\int$, and
- the state-feedback controller L receives a difference between the control effort signal $X_{ref}$ and the signal x via a second feedback loop, and generates u as an input to the second circuit B.

16. The control system of claim 15, wherein:

$\dot{x}=Ax+Bu$; and $y=Cx$, wherein x is the signal generated by the integrator circuit $\int$ and is indicative of the state of the associated robot,
wherein y is the output signal of the state-feedback circuit,
wherein u is the signal generated by the state-feedback controller L, and
wherein A, B, and C correspond to the first circuit A, the second circuit B, the third circuit C, respectively.

17. The control system of claim 16, wherein:

$u=L(x_{ref}-x)$, and wherein L is the feedback gain of the state-feedback controller L.

18. The control system of claim 16, wherein:

$S=(I+GK)^{-1}$, $R=K(I+GK)^{-1}$, and $T=GK(I+GK)^{-1}$, wherein I is an identity matrix,
wherein G is the state-feedback circuit,
wherein K is the controller,
wherein R is indicative of control effort,
wherein S is indicative of a sensitivity function, and
wherein T is indicative of a complementary sensitivity function.

* * * * *